(12) United States Patent
Peden et al.

(10) Patent No.: US 12,705,594 B2
(45) Date of Patent: Aug. 11, 2026

(54) VIRTUAL REALITY IDENTITY, DIGITAL ASSET TOKENS, AND CARRIER BILLING OF A USER

(71) Applicant: T-Mobile Innovations LLC, Overland Park, KS (US)

(72) Inventors: Mark Peden, Paola, KS (US); Raymond Reeves, Orlando, FL (US); Simon Youngs, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 375 days.

(21) Appl. No.: 18/361,715

(22) Filed: Jul. 28, 2023

(65) Prior Publication Data

US 2025/0037097 A1 Jan. 30, 2025

(51) Int. Cl.
*G06Q 20/12* (2012.01)
*G06Q 20/40* (2012.01)
*H04W 8/18* (2009.01)

(52) U.S. Cl.
CPC ....... *G06Q 20/123* (2013.01); *G06Q 20/4014* (2013.01); *H04W 8/18* (2013.01)

(58) Field of Classification Search
None
See application file for complete search history.

(56) References Cited

U.S. PATENT DOCUMENTS

2009/0228550 A1* 9/2009 Kawachiya ............. A63F 13/12 707/999.103
2022/0051180 A1* 2/2022 Altieri .................. G06Q 10/087

* cited by examiner

*Primary Examiner* — Matthew S Gart
*Assistant Examiner* — Liz P Nguyen

(57) ABSTRACT

A federated identity manager server configured to receive, from a metaverse server, a virtual identity and user credentials associated with the virtual identity; receive, from a mobile network operator (MNO), subscriber information of the user; create a trusted identity based on the virtual identity and the subscriber information; receive, from the metaverse server, a request to purchase the digital content by the virtual identity; send, to the metaverse server, a verification request that includes a validation challenge for the virtual identity in the metaverse application; send, to a communication device, a verification result that indicates the user of the communication device is verified to purchase the digital content; send, to the MNO, billing confirmation for the digital content, wherein the billing confirmation indicates the digital content is allocated to the user; and receive, from the MNO, a confirmation message that indicates the user is carrier billed for the digital asset.

19 Claims, 8 Drawing Sheets

VIRTUAL REALITY IDENTITY, DIGITAL ASSET TOKENS, AND CARRIER BILLING OF A USER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication devices such as, for example, consumer devices and Machine-to-Machine (M2M) communication devices are widely deployed in a wireless network, such as a cellular network. These mobile devices may include a smart phone, a tablet computer, a wearable computer, a game console, or portable and desktop computers, while M2M devices may include a thermostat, a refrigerator, a water meter, or other everyday Internet of Things (IoT) devices. These communication devices may access any number of cellular and Internet Protocol (IP) networks for receiving text data, voice data, video data, support services, and other similar services. Cellular networks may exchange wireless signals with mobile communication devices using wireless network protocols. Exemplary wireless network protocols include Institute of Electrical and Electronic Engineers (IEEE) 802.11 (WIFI), Long Term Evolution (LTE), Fifth generation (5G) new radio (5GNR), and Low-Power Wide Area Network (LP-WAN).

Many aspects of a user's activities are tied to communicating information and/or data over the Internet or a wireless network. Some aspects may include interacting with other users within a metaverse, both socially and economically. A metaverse is a fully immersive three-dimension (3D) virtual environment, where a user is represented by an avatar and the user's interactions are based upon a metaphor of the real world but, in most cases, without the physical limitations of the real world. The metaverse may be a virtual reality (VR) environment characterized by a metaverse application (for example, a virtual reality application) that provides a virtual/3D world that persists after a user stops interacting in the virtual world or an augmented reality (AR) environment that combines aspects of the virtual world and a physical world. A user may enter the metaverse via a metaverse application that may be accessed through a smart phone, a tablet computer, a wearable computer, a portable or desktop computer, or a game console.

SUMMARY

In an embodiment, a system comprising a metaverse server, a federated identity manager server, and a mobile network operator (MNO) is disclosed. The metaverse server is configured to receive, from a user communication device, a request to purchase a digital content by a virtual identity in a metaverse application, wherein the virtual identity is associated with a user of the user communication device, and wherein the metaverse server comprises the metaverse application; and send, to a federated identity manager server, the request to purchase the digital content and the virtual identity. The federated identity manager server is configured to receive, from the metaverse server, the virtual identity and user credentials of the user associated with the virtual identity; receive, from a mobile network operator (MNO), subscriber information of the user; create a trusted identity of the user based on the virtual identity and the subscriber information; receive, from the metaverse server, a request to purchase the digital content; send, to the metaverse server, a verification request responsive to receiving the request to purchase the digital content, wherein the verification request includes a predetermined action to be performed by the virtual identity in the metaverse application; send, to the metaverse server, a verification result responsive to sending the verification request, wherein the verification result indicates the user is verified to purchase the digital asset; and send, to the MNO, billing confirmation for the digital content, wherein the billing confirmation indicates the digital content is allocated to the user. The MNO is configured to charge the user for the digital content based on carrier billing responsive to receiving the billing confirmation.

In another embodiment, a system is disclosed. The system comprises a federated identity manager server coupled to an MNO. The federated identity manager server is configured to receive, from a metaverse server, a virtual identity in a metaverse application and user credentials of a user associated with the virtual identity in the metaverse application, receive, from a mobile network operator (MNO), subscriber information of the user, create a trusted identity of the user based on the virtual identity and the subscriber information, receive, from the metaverse server, a request to purchase the digital content by the virtual identity in a metaverse application of the metaverse server, send, to the metaverse server, a verification request responsive to receiving the request to purchase the digital content, wherein the verification request includes a predetermined action to be performed by the virtual identity in the metaverse application, send, to the metaverse server, a verification result responsive to sending the verification request, wherein the verification result indicates the user is verified to purchase the digital content, send, to the MNO, billing confirmation for the digital content, wherein the billing confirmation indicates the digital content is allocated to the user. The MNO is configured to charge the user for the digital content based on carrier billing responsive to receiving the billing confirmation.

In yet another embodiment, a federated identity manager server comprises a central processing unit (CPU) and a non-transitory memory comprising executable instructions that when executed by the CPU cause the federated identity manager server to receive, from a metaverse server, a virtual identity and user credentials of the user associated with the virtual identity, wherein the metaverse server comprises the metaverse application; receive, from a mobile network operator (MNO), subscriber information of the user; create a trusted identity of the user based on the virtual identity and the subscriber information; receive, from the metaverse server, a request to purchase digital content by the virtual identity in the metaverse application; send, to the metaverse server, a verification request responsive to receiving the request to purchase the digital content, wherein the verification request includes a validation challenge comprising a predetermined action to be performed by the virtual identity in the metaverse application; send, to a communication device via the metaverse server, a verification result responsive to sending the verification request, wherein the verification result indicates the user of the communication device is verified to purchase the digital content; send, to the MNO, billing confirmation for the digital content, wherein the billing confirmation indicates the digital content is allocated to the user; and receive, from the MNO, a confirmation message that indicates the user is carrier billed for the digital asset.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
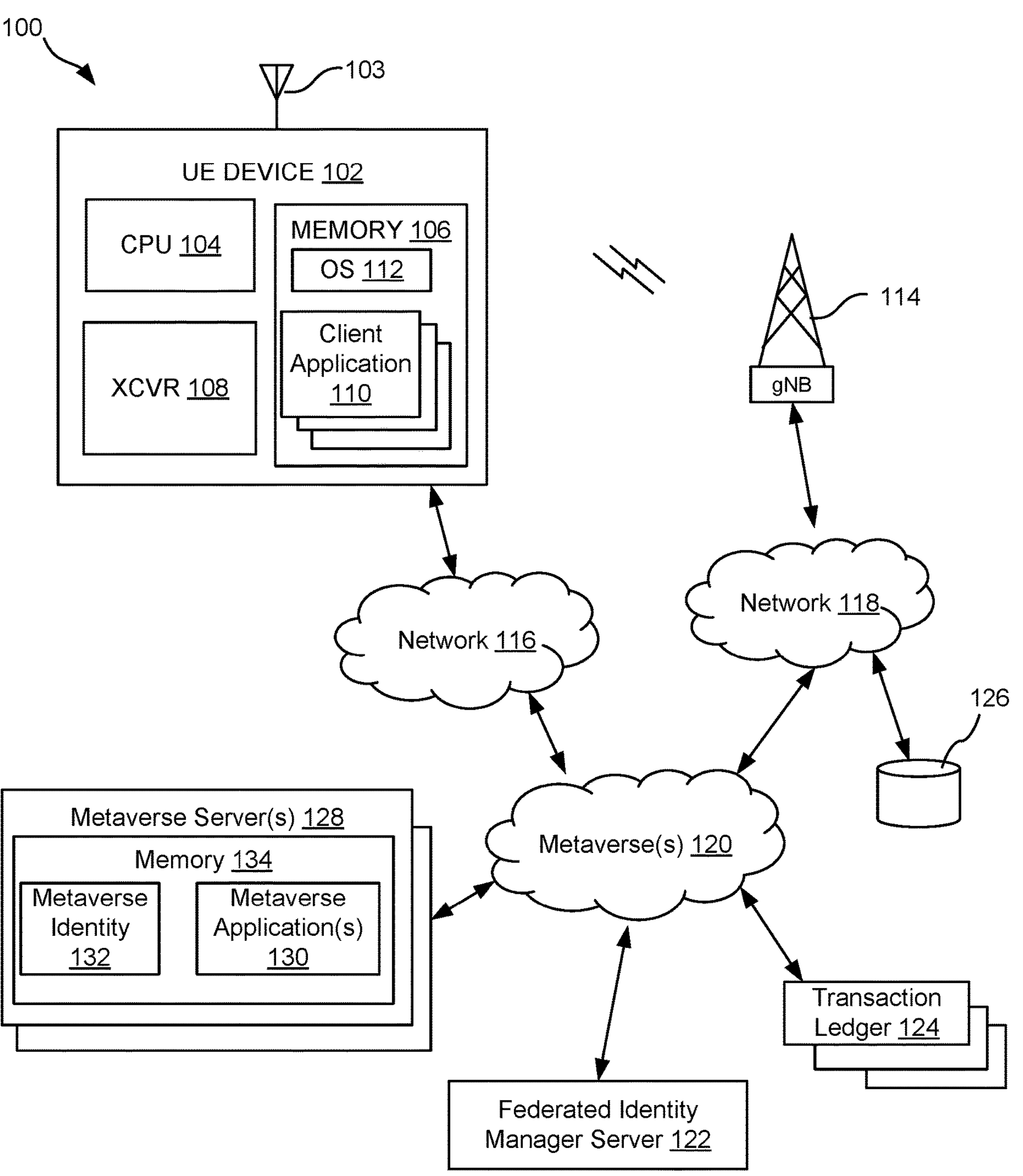
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Communication devices such as, for example, consumer devices are widely deployed in a wireless network, such as a cellular network. These communication devices may include a game console, a smart phone, a tablet computer, or portable and desktop computers that may interact within other users within a metaverse environment. These communication devices may access any number of cellular and Internet Protocol (IP) networks for receiving text data, voice data, video data, support services, and other similar services. Cellular networks may exchange wireless signals with mobile communication devices using wireless network protocols. Exemplary wireless network protocols include Institute of Electrical and Electronic Engineers (IEEE) 802.11 (WIFI), Long Term Evolution (LTE), Fifth generation (5G) new radio (5GNR), and Low-Power Wide Area Network (LP-WAN).

Many aspects of a user's activities are tied to communicating information and/or data over the Internet or a wireless network. In an example, the user's avatar may interact with other users and with software agents in the 3D virtual environment/3D virtual space of the metaverse. In an example, the metaverse may be an online VR social platform, a VR or augmented reality (AR) online multi-player game, or other similar online game where each user may interact with other users in the metaverse via avatars. In the metaverse, the user is represented by an avatar (for example, a virtual identity or persona having a display name, a profile picture, a player/playable character). In an example, the metaverse environment may provide an online multi-player game or a 3D environment whereby a user's avatar may interact with other users via other user avatars or with objects in the metaverse such as, for example, buildings, phones, automobiles, or other similar digital objects that have analogues with the exterior world. In an example, a user avatar may also purchase digital assets or digital experiences within the metaverse that may include digital goods or services, digital real estate, identities, property rights, or the like. A user may also create multiple avatars in different metaverses (or multiverse), and may use a variety of communication devices to purchase digital assets across the metaverses.

A user may use multiple devices to access the multiverse, and each communication device may have to establish a level of trust with a metaverse provider in order to enable the user to authenticate the user and perform transactions within the metaverse. However, authenticating a user may be difficult as a trusted identity of the user may not be seamless across different metaverse providers. A user may be associated with different avatars across metaverses, and authenticating the user may be difficult for each avatar and device that is used within the metaverse. Further, spoofing and phishing attacks have risen whereby compromised user identities are used to fraudulently acquire digital assets. As a user may use different communication devices with different avatars, authenticating the user's identity in the real-world for charging the user for digital assets that are purchased in the virtual world may be a growing challenge.

In an embodiment, a user of a client device may purchase digital assets in a metaverse using metaverse/in-game currency (for example, coins, points, credits), and may automatically be direct carrier billed in the physical world by the user's mobile network operator (MNO) or cellular network operator for the purchase made in the metaverse. In an example, a trusted identity of the user may be initially created by a federated identity manager server. In an example, the federated identity manager server is an orchestrator system comprising software that communicates with different metaverses to receive metaverse identities of the user from a plurality of metaverses in order to create and manage a trusted identity of a user across the plurality of metaverses. In an example, each metaverse identity of the user in a distinct metaverse is mapped to a trusted identity of the user, and further linked to user credentials that are managed at the MNO. In this way, all metaverse identities of a user are aggregated by the federated identity manager server to create one trusted identity that may be used to validate the user's metaverse identities for transactions performed by the user in the different and distinct metaverses. In an example, a federated identity manager may create a trusted identity using a metaverse identity (also referred to as a virtual identity) of the user in a metaverse application (for example, an avatar of the user) and subscriber information of the user associated with the user at the MNO. In an example, each metaverse server hosting a metaverse application may publish the user's metaverse identity and user information associated with a metaverse application to the federated identity manager when a user creates a metaverse identity in the metaverse application. In an example, the MNO of the user may push subscriber information such as, for example, a Mobile Station Integrated Services Digital Network (MSISDN) number associated with a user of a communication device as well as user name and user address to the federated identity manager. In an example, the trusted identity may be used to identify the user of the metaverse identity and associate it to the user/subscriber information at the MNO such as, for example, subscriber name and address, and financial information of the subscriber (such as a financial institution information, credit card information, address of the user, or the like) based on the MSISDN.

In an example, a user of the communication device may use the metaverse identity to purchase digital content that is available to purchase while using the metaverse application. In an example, the digital content may include digital assets or experiences such as, for example, avatars, digital real-estate, digital goods, digital services, or the like. In an example, a user of a client device may purchase digital assets in a metaverse using metaverse/in-game currency (for example, coins, points, credits), transmitting purchase information to a federated identity manager. In an example, the metaverse application may transmit the purchase information and the metaverse identity associated with the purchase to the federated identity manager.

In an example, the federated identity manager may send a push notification to the user associated with the metaverse identity in order to authenticate/validate the purchase transaction. In an example, the push notification may be sent to the user's metaverse identity in the metaverse indicating a purchase transaction that is associated with the metaverse identity, and requesting the user to validate the purchase transaction, while the metaverse identity is currently active in the metaverse. In another example, while the metaverse identity is not currently active, the push notification may be sent to the MSISDN associated with the metaverse identity that requests the user to login into the metaverse and validate the purchase transaction. In an example, the validation may include a request that the user perform one or more pre-defined tasks/challenges in the metaverse within a pre-defined time period in order to complete the purchase transaction. In an example, the federated identity manager may store an authentication factor/authentication challenge that may include the pre-defined task/challenge that the user may have to perform in order to authenticate a user with an associated metaverse identity when the associated metaverse identity initiates the transaction in the metaverse. Requiring a pre-defined challenge provides privacy/security benefits over conventional solutions. For instance, a benefit includes user privacy as the metaverse may not know the user's subscriber information at the MNO or other confidential information (for example, the metaverse may not know the "true" identity of the user tied to an MSISDN or other associated user account information at the MNO). Therefore, a hacker or other unauthorized user attempting to access the user's information in the metaverse (for example, an aggressive metaverse owner/operator) may only be able to obtain minimal identification information about the user associated with the user's metaverse identity. Moreover, the hacker/unauthorized user may not be able to gain access to financial or other confidential information of the user since the multi-factor authentication based on the pre-defined task/challenge may be only be known to the user who arranges payment through the trusted identity. Also, in an example, the federated identity manager may create a trusted identity of the user. In an example, the federated identity manager associates the user's trusted identity to all of the user's metaverse identities across the metaverses (for example, the user's metaverse identities are tied to a common trusted identity). Further, in an example, the federated identity manager associates the user's trusted identity to the user's subscriber information at the MNO. In an example, only the federated identity manager may know the user's trusted identity that is used by the federated identity manager to map between a user's first metaverse identity and the user's second metaverse identity or between a first metaverse identity and the user's subscriber information at the MNO. Therefore, the user's metaverse identities may also be protected across different metaverses without exposing the user's identity that is tied to a common trusted identity. Further, a user making a purchase in one metaverse may see a combined billing charge from an entity (for example, an MNO) but separate tracking information for each purchase made in the different metaverses.

In an example, the federated identity manager may send a message to the user indicating the result of an authentication request for the purchase of digital assets. In an example, the federated identity manager may send confirmation that the metaverse identity has successfully performed the authentication challenge within the predefined time period and that the purchase transaction in the metaverse has been completed. In an example, the federated identity manager may send billing information for the user to the MNO requesting legal tender, which are coins and paper money of an issuing government, for a purchase made by the user in the metaverse. In an example, the billing information may include subscriber information associated with the user at the MNO. In an example, the MNO may charge the subscriber of the MNO with the purchase made by the subscriber using the metaverse identity in the metaverse.

Turning now to FIG. 1, a communication system 100 is described according to an embodiment. In an embodiment, the communication system 100 is configured to authenticate a metaverse/virtual identity of a user of a client device as a subscriber of a mobile network operator (MNO), when the metaverse identity is used to purchase a digital asset in the metaverse and implement carrier billing of the user at the MNO based on the digital asset purchase in the metaverse. In an embodiment, the communication system 100 may comprise user device/user equipment (UE) 102, cell site 114, communication network 116, communication network 118, Metaverse environment 120, a federated identity manager server 122, and storage 126.

The UE 102 may be a communication device such as, for example, game console, a smart phone, a tablet computer, or portable and desktop computers. The UE 102 may be a fixed communication device or a mobile communication device. In an embodiment, the UE 102 comprises an antenna 103, a central processing unit (CPU) 104, a memory 106 that stores an operating system (OS) 112, a cellular transceiver 108, and one or more client applications 110.

In an embodiment, the antenna 103 may be communicatively coupled to the cellular transceiver 112 and the client applications 110 through a wired connection. The antenna 103 may include radio frequency (RF) reception and transmission components of the UE 102, and may be part of the cellular transceiver 108. In an embodiment, the cellular transceiver 108 may establish a radio communication link to the cell site 114 using the antenna 103. The radio communication link may be established according to an LTE protocol, a Code Division Multiple Access (CDMA) protocol, a Global System for Mobile Communications (GSM) protocol, or a 5th generation mobile network (5G) telecommunication protocol. In an embodiment, the cellular transceiver 108 includes a 5G RAT that provides an air interface for the UE 102. While not shown in FIG. 1, the cellular transceiver 108 may include additional circuit components to process and manipulate the wireless signals at the UE 102.

The memory 106 comprises a non-transitory portion that embeds one or more applications for execution by the CPU 104. In embodiments, the memory 106 embeds an operating system (OS) 112 and client applications 110. In an embodiment, the OS 112 comprises executable instructions of an OS kernel of the UE 102. In an embodiment, the OS 112 may be executed to perform operations such as, for example, operations to manage input/output data requests to the UE 102 (e.g., from software and/or client applications 110), translate the requests into instructions (e.g., data processing instructions) for execution by the CPU 104 or other components of the UE 102, manage the UE 102 resources, such as the CPU 104 and the memory 106 when executing and providing services to applications on the UE 102 such as client applications 110.

In an embodiment, the UE 102 may include one or more client applications 110 that may be configured as metaverse applications that may send and receive instructions and/or commands to a metaverse server 120. In another example, one or more of the client applications 110 may be configured as web browser applications to access the metaverse application 130 on metaverse server 128 for communicating instructions and/or commands associated with executing instructions on the metaverse application 130. In an example, the metaverse applications 110 or 130 may be video gaming applications. In examples, the client applications 110 may include one or more of a virtual private network (VPN) client such as an Internet Protocol Security (IPsec) protocol suite for establishing a secure connection/tunnel over WLAN between a client application 110 and the metaverse server 120. In an example, the UE 102 or client applications 110 may receive notifications from a mobile carrier (e.g., an MNO) or metaverse server 128 based on the user's activity on the client applications 110 while connected to the metaverse server 128. In an example, the notifications may include a text message, a voice message, a voice call, or a token-based authentication request or response for authenticating a user associated with the client application 110 on UE 102.

The UE 102 may be communicatively coupled to communication network 116 and to communication network 118. In an example, the UE 102 may be wirelessly coupled to the cell site 114 for connecting the UE 102 to communication network 118 and/or may be coupled via a wired connection to communication network 116. In an example, the communication network 118 may be a core network (for example, a macro network) of a network provider/MNO, and the communication network 116 may be a data network such as the Internet. In an embodiment, the UE 102 may request 5G services of the communication network 118 using the radio communication link. In examples, the communication link between the communication network 118 and UE 102 may be established according to an LTE protocol, a CDMA protocol, a GSM protocol, or a 5G telecommunication protocol. The communication network 118 may provide 5G services including voice, data, and messaging services to the UE 102 using virtual network functions. The communication networks 116, 118 may be communicatively coupled to metaverse environments 120 (for example, a multiverse). The system 100 may comprise additional communication networks similar to communication network 118 and any number of cell sites 114.

In an example, the metaverse environment 120 (hereinafter metaverse 120) may be composed of a plurality of metaverses, with each metaverse being associated with a metaverse server 128. In an example, each metaverse server 128 may be managed by a metaverse provider for providing an online 3D environment for a user/subscriber of the metaverse. In an example, the metaverse server 120 may include a memory 134 that stores metaverse applications 130 and metaverse identity 132.

In an example, each metaverse server 128 may be a dedicated server hosting one or more metaverse applications 130 such as, for example, one or more video gaming platforms for providing remote access to users to role-playing scenarios and other resources within the metaverse applications 130 while a user of the UE 102 is interacting within a metaverse at metaverse server 120. In an example, the metaverse server 128 may also provide third-party resources in metaverse applications 130 such as for example, digital content from metaverse content providers that includes digital content that may be purchased within the metaverse application 130. Each metaverse identity may be a VR identity (for example, an avatar in a metaverse) and may include authentication information of a user/subscriber in the metaverse application 130. In an example, the authentication information may include login information (e.g., user name, password), and one or more authentication factors as part of multi-factor authentication (MFA) system that may be used to authenticate the user in each metaverse application 130. In an example, the metaverse identity 132 may be stored to memory 134. In an example, the user may have one or more metaverse identities (e.g., avatars) in a metaverse application 130 while interacting within a metaverse. In an example, each metaverse server 128 may use an application programming interface (API) to publish the user's metaverse identity 132 and user information associated with a metaverse application 130 to federated identity manager server 122.

In an example, federated identity manager server 122 may be an identity broker that may create a trusted identity using the metaverse identity 132 of the user and subscriber information of the user associated with the user at the MNO. Each trusted identity at the federated identity manager server 122 may be linked with one or more metaverse identities 132 from one or more metaverse providers. In an example, the trusted identity establishes a trust connection between each metaverse identity 132 in the metaverses 120 with the subscriber information at the MNO. In an example, the MNO may publish subscriber information associated with each MSISDN to the federated identity manager server 122. In another example, metaverse server 128 may push the user phone number to the federated identity manager server 122 to create the mapping between the user's metaverse identity and the subscriber information received from the MNO. In an example, the federated identity manager server 122 may create the trusted identity of the user by mapping each metaverse identity 132 to subscriber information of the user at the MNO such as, for example, a Mobile Station Integrated Services Digital Network (MSISDN) number of the UE 102 at the MNO. In an example, the MSISDN is a unique number that may be used to route voice and short messaging service (SMS) traffic to and from the UE 102 on the cellular network. In an example, the trusted identity may be used to identify a user associated with the metaverse identify 132 and associate it to the user/subscriber information at the MNO such as, for example, subscriber name and address, and financial information of the subscriber (such as a financial institution information, credit card information, address of the user, or the like) based on the MSISDN.

In an example, the trusted identity may be used for carrier billing (for example, billing a subscriber account of a user at the MNO) when the user makes a purchase within the metaverse through the user's metaverse identity 132. In an example, the federated identity manager server 122 may authenticate a purchase of a digital asset made in the metaverse to the user and communicate the purchase to the MNO in the communication network 118. In an example, the MNO associated with the user of the digital asset purchase may carrier bill the user based on subscriber/user information stored at database 126. In an example, federated identity manager server 122 may store one or more authentication factors or authentication challenges that may be requested from a user associated with the metaverse identity 132 when the user associated with the metaverse identity 132 purchases a digital asset in the metaverse. In an example, the authentication factors or authentication challenges may include one or more pre-defined tasks/challenges that may be performed by the metaverse identity in the metaverse within a predefined time period in order to complete the purchase transaction. In an example, the authentication factor may require the avatar to perform a predefined motion (for example, waving the avatar's hands a preset number of times, turning on a light switch a predefined number of times, or the like) within a predetermined time period in order to authenticate a user's avatar with an associated metaverse identity 132 when the avatar initiates the transaction in the metaverse.

In an example, the federated identity manager server 122 may store the trusted identity within a transaction ledger 124. In an example, the transaction ledger 124 may be a centralized ledger managed by the federated identity manager server 122 or may be a decentralized ledger. In an example, purchased digital assets of a user in a metaverse made with metaverse currency/in-game currency may be stored in transaction ledger 124. The transaction ledger may tokenize the purchase digital assets with unique identification codes and metadata to form non-fungible tokens (NFTs) that may be stored in multiple transaction ledgers similar to transaction ledger 124.

In an example, a trusted identity may be a trusted identity of a user that may be created and managed by the federated identity manager server 122. In an example, the trusted identity is a centralized identity of the user that is tied to each of the user's metaverse identities in the metaverse. In an example, the trusted identity may be associated with each subscriber account that is authorized for the user at an MNO and may include a Mobile Station Integrated Services Digital Network (MSISDN) of the user, financial information for billing the user, billing address of the user, or the like. The trusted identity may be used for carrier billing that is billed to the subscriber account at the MNO when the user makes purchases in the metaverse through the metaverse identity. The trusted identity may be used to map each virtual identity of the user that may be used by the MNO to bill the user associated with a carrier identity of the user (e.g., a user account) at the MNO. Each virtual identity (or metaverse identity) of the user in the metaverse may be mapped to the trusted identity of the user.

Figure 2:
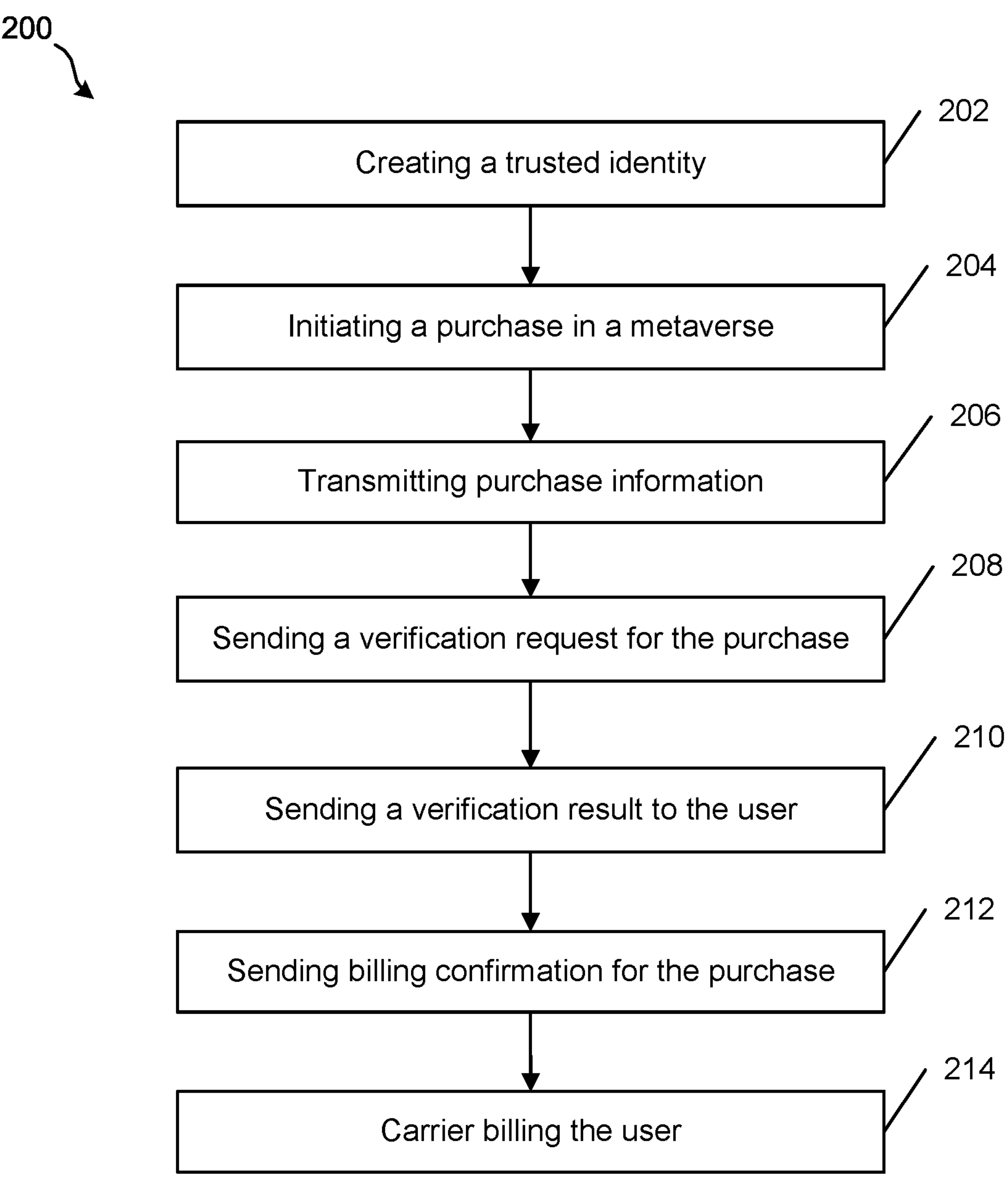
FIG. 2 is a flow chart of a method according to an embodiment of the disclosure.

Turning now to FIG. 2, and with continued reference to FIG. 1, a method 200 is described. In an embodiment, the method 200 is a process for carrier billing a user at a mobile network operator (MNO) when a metaverse identity of the user is used to purchase a digital asset in the metaverse. In examples, the communication device may be a consumer device such as, for example, the UE 102 in FIG. 1 and may be used to purchase digital assets and or receive notifications in the metaverse.

At block 202, the method comprises creating a trusted identity by a federated identity manager (for example, the federated identity manager server 122 in FIG. 1). In an example, the trusted identity establishes a trust connection between each metaverse identity in the metaverse and the subscriber information of the user at the MNO. In an example, a federated identity manager may create the trusted identity based on a combination of a metaverse identity of the user in a metaverse application (for example, an avatar of the user) and subscriber information of the user associated with the user at the MNO. In an example, each metaverse server hosting the metaverse application may use an application programming interface (API) to publish the user's metaverse identity and user information associated with a metaverse application to the federated identity manager when a user creates a metaverse identity for the metaverse application. In an example, the user information may include information of the user in a physical world such as a phone number. In an example, the user information may be used to map to corresponding subscriber information of the user at an MNO. In an example, the MNO of the user may push subscriber information such as, for example, an MSISDN associated with a user name and user address to the federated identity manager via a secure tunnel (for example, IPsec tunnel). In an example, the federated identity manager may create the trusted identity using the metaverse identity of the user and subscriber information of the user at the MNO. In an example, the trusted identity may be used to identify the user of the metaverse identity for digital transactions in the metaverse and associate it to the user/subscriber information at the MNO in the physical world based on the MSISDN for carrier billing. In an example, the user/subscriber information may include, for example, a subscriber name and address, and financial information of the subscriber (such as a financial institution information, credit card information, address of the user, or the like) based on the MSISDN in order to carrier bill the user by the MNO.

At block 204, the method 200 comprises initiating a purchase by a user in a metaverse. In an example, a user of the communication device may use the virtual identity (for example, a metaverse identity) of the user to purchase digital content that is available to purchase while currently active in the metaverse application 130 at the metaverse server 128. In an example, the digital content may include digital assets or experiences such as, for example, avatars, digital real-estate, digital goods, digital services, or the like. In another example, purchasing digital real-estate may include additional charges for digital insurance that may be needed to insure the digital real-estate in the metaverse. In an example, a user of a client device may initiate purchase digital assets in a metaverse using monetary value allocated as metaverse/in-game currency (for example, coins, points, credits). In another example, the digital assets may be allocated a monetary value in a legal tender that may include coins and paper money of an issuing government.

At block 206, the method 200 comprises transmitting purchase information to a federated identity manager. In an example, the metaverse application at the metaverse server may transmit the request to purchase the digital content by the metaverse identity to the federated identity manager and the metaverse identity associated with the purchase of digital content to the federated identity manager.

At block 208, the method 200 comprises sending a verification request for the purchase of digital content. In an example, the federated identity manager may send a verification request in the form of a push notification to the user associated with the metaverse identity in order to authenticate/validate the user as an authorized user for the purchase of digital content. In an example, the push notification may be sent to the user's metaverse identity in the metaverse when the user communication device is connected to the metaverse via the metaverse application and actively using the metaverse application. In an example, the push notification may indicate to the user that a purchase transaction is associated with the metaverse identity, and request the user to validate the purchase transaction via the metaverse identity while the metaverse identity is actively using the metaverse application in the metaverse. In another example, while the metaverse identity is not actively using the metaverse application, the push notification may be a text message that is sent to the MSISDN associated with the metaverse identity. In an example, the push notification may request the user to login into the metaverse via the metaverse application and use the metaverse identity to validate the purchase transaction. In an example, the validation may include a request that the user perform one or more predefined tasks/challenges in the metaverse within a predefined time period in order to complete the purchase transaction (for example, waving the avatar's hands a preset number of times, turning on a light switch a predefined number of times, or the like) otherwise the transaction may not be authorized. In an example, the push notifications may include calendar notifications, and other notifications that may be preauthorized by the user associated with the metaverse identity.

At block 210, the method 200 comprises sending a verification result to the user. In an example, the federated identity manager may send a response message to the user's metaverse identity indicating the result of the verification request that was sent to the metaverse identity for verifying the purchase of digital assets. In an example, the federated identity manager may send, when the metaverse identity is active, a confirmation message to the metaverse server or a confirmation message to a phone number associated with the user (e.g., a MSISDN) that the metaverse identity has successfully performed the authentication challenge within the predefined time period and that the purchase transaction in the metaverse has been authorized. In another example, the federated identity manager may send, when the metaverse identity is active, a denial message that the purchase of digital content is being denied because the user was not verified as initiating the transaction (for example when the authentication challenge was not completed in the predefined time period or when the verification request was ignored by the user).

At block 212, the method 200 comprises sending billing confirmation to the MNO. In an example, the federated identity manager may send billing confirmation to the MNO when the purchase of digital assets is authorized for the user in the metaverse (for example, allocated to the user in the metaverse). In an example, the federated identity manager may request reimbursement in legal tender for the digital asset that is allocated to the user for use in the metaverse application. In an example, the billing confirmation may include subscriber information of the user at the MNO. In an example, the purchased digital assets in the metaverse may be stored by the federated identity manager in a distributed ledger with tokens to form non-fungible tokens (NFTs). In an example, the NFTs identify ownership rights of the user to the digital asset in a particular metaverse or VR environment. In an example, the NFTs may be transferred within the metaverse to other users, whereby the MNO may credit the user in the physical world for the transfer in the metaverse.

At block 214, the method 200 comprises carrier billing the user. In an example, the MNO may charge the subscriber of the MNO with legal tender for the purchase made by the subscriber using the metaverse identity in the metaverse. In an example, the MNO may use subscriber information for charging the subscriber for purchasing digital content in the metaverse that may include, for example, user address and user financial information. In an example, the MNO may send a confirmation message to the federated identity manager indicating the user was carrier billed for the digital asset.

Figure 3:
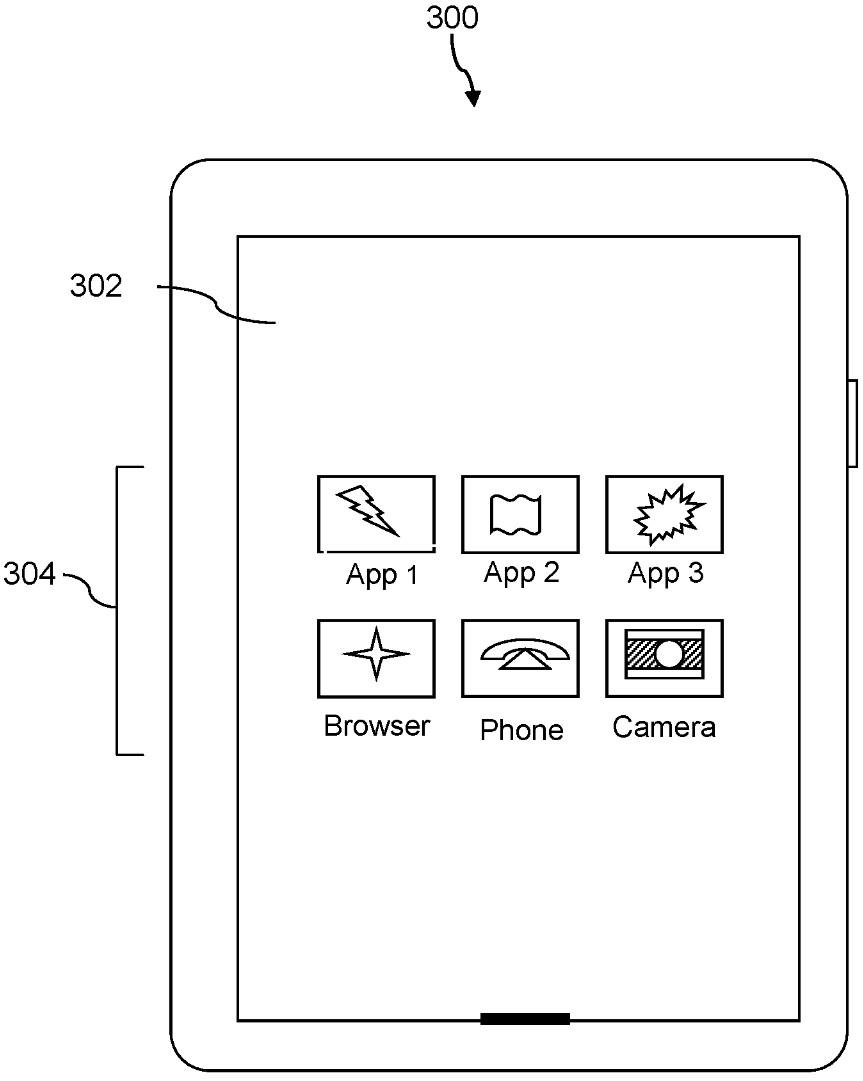
FIG. 3 is an illustration of a communication device according to an embodiment of the disclosure.

FIG. 3 depicts user equipment (UE) 300, which is operable for implementing aspects of the present disclosure, but the present disclosure should not be limited to these implementations. Though illustrated as a communication device, the UE 300 may take various forms including a game console, a smart phone, a tablet computer, or portable and desktop computers.

The UE 300 includes a touchscreen display 302 having a touch-sensitive surface for input by a user. A small number of application icons 304 are illustrated within the touch screen display 302. It is understood that in different embodiments, any number of application icons 304 may be presented in the touch screen display 302. In some embodiments of the UE 300, a user may be able to download and install additional applications on the UE 300, and an icon associated with such downloaded and installed applications may be added to the touch screen display 302 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 302 to show a web page. The web page may be obtained via wireless communications with a base transceiver station, a wireless network access node, a peer UE 300 or any other wireless communication network or system.

Figure 4:
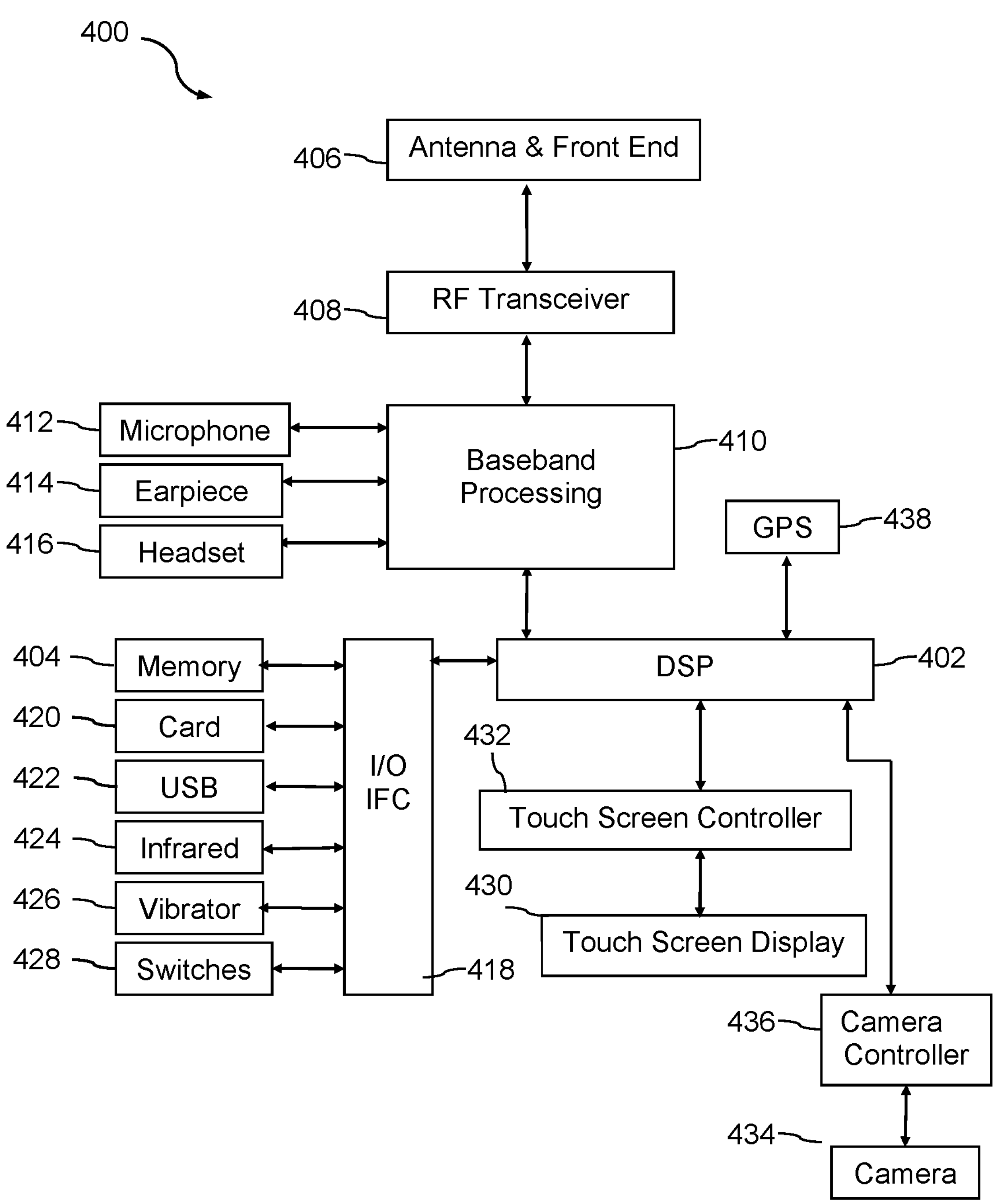
FIG. 4 is a block diagram of a hardware architecture of a communication device according to an embodiment of the disclosure.

FIG. 4 shows a block diagram of the UE 400. While a variety of known components of a communication device are depicted, in an embodiment a subset of the listed components and/or additional components not listed may be included in the UE 400. The UE 400 includes a digital signal processor (DSP) 402 and a memory 404. As shown, the UE 400 may further include one or more antenna and front end unit 406, a one or more radio frequency (RF) transceiver 408, a baseband processing unit 410, a microphone 412, an earpiece speaker 414, a headset port 416, an input/output (I/O) interface 418, a removable memory card 420, a universal serial bus (USB) port 422, an infrared port 424, a vibrator 426, one or more electro-mechanical switches 428, a touch screen display 430, a touch screen controller 432, a camera 434, a camera controller 436, and a global positioning system (GPS) receiver 438. In an embodiment, the UE 400 may include another kind of display that does not provide a touch sensitive screen. In an embodiment, the UE 400 may include both the touch screen display 430 and additional display component that does not provide a touch sensitive screen. In an embodiment, the DSP 402 may communicate directly with the memory 404 without passing through the input/output interface 418. Additionally, in an embodiment, the UE 400 may comprise other peripheral devices that provide other functionality.

The DSP 402 or some other form of controller or central processing unit operates to control the various components of the UE 400 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the UE 400 to function as a peripheral device to exchange information with a personal computer or other computer system. The infrared port 424 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, an LTE protocol, a CDMA protocol, a GSM protocol. In an embodiment, one of the radio transceivers 408 may comprise a near field communication (NFC) transceiver. The NFC transceiver may be used to complete payment transactions with point-of-sale terminals or other communications exchanges. In an embodiment, each of the different radio transceivers 408 may be coupled to its own separate antenna. In an embodiment, the UE 400 may comprise a radio frequency identify (RFID) reader and/or writer device.

The switches 428 may couple to the DSP 402 via the input/output interface 418 to provide one mechanism for the user to provide input to the UE 400. Alternatively, one or more of the switches 428 may be coupled to a motherboard of the UE 400 and/or to components of the UE 400 via a different path (e.g., not via the input/output interface 418), for example coupled to a power control circuit (power button) of the UE 400. The touchscreen display 430 is another input mechanism, which further displays text and/or graphics to the user. The touch screen LCD controller 432 couples the DSP 402 to the touch screen display 430. The GPS receiver 438 is coupled to the DSP 402 to decode global positioning system signals, thereby enabling the UE 400 to determine its position. In an embodiment, the UE 400 is the UE 102 of FIG. 1 that may include a smart high-science appliance such as a smart vehicle, a smart appliance (for example, a smart refrigerator), a smart phone, a wearable computer, a personal digital assistant (PDA), a headset computer, a laptop computer, a notebook computer, and a tablet computer.

Figure 5:
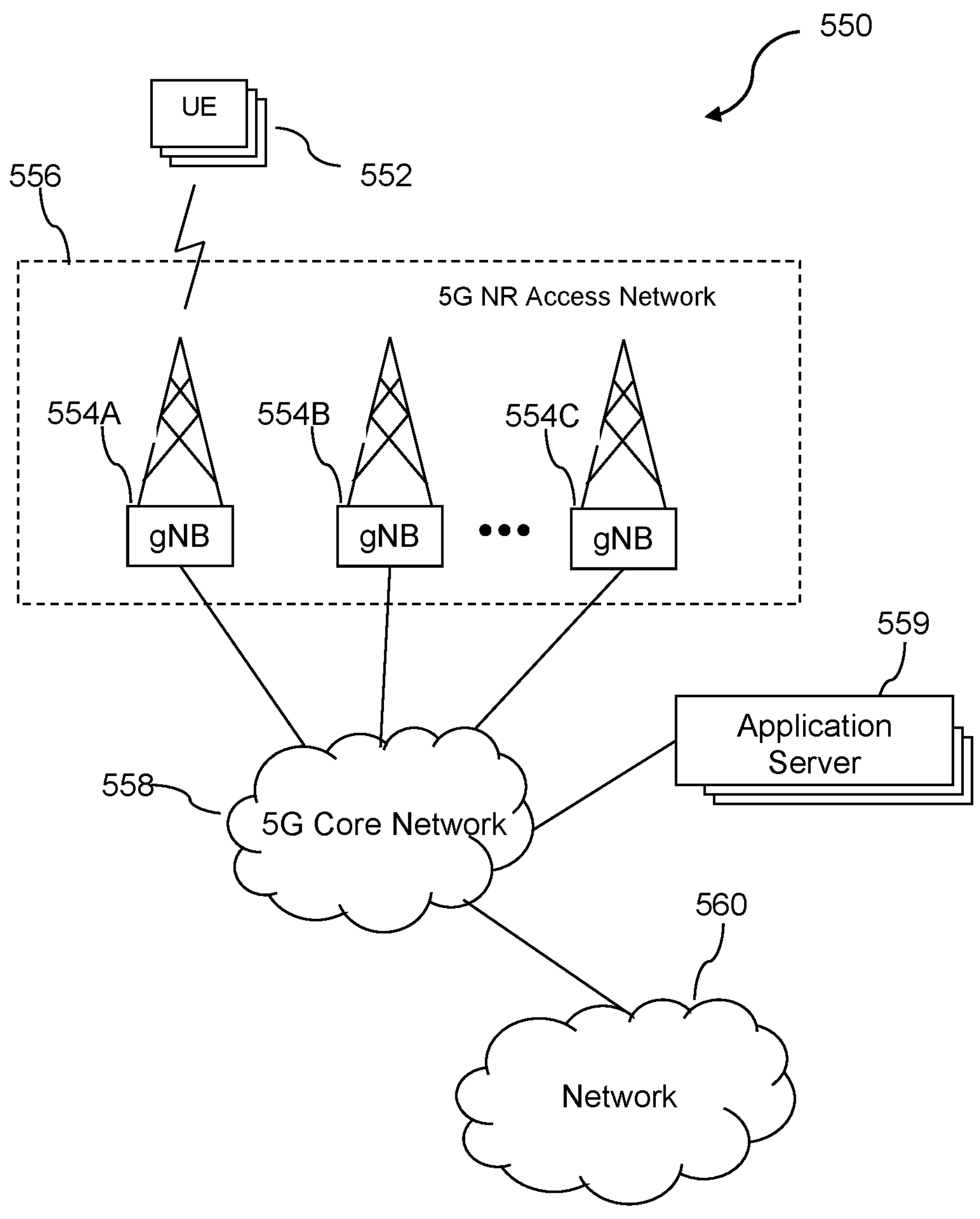
FIG. 5 is a block diagram of a communication system according to an embodiment of the disclosure.

Turning now to FIG. 5, an exemplary communication system 550 is described. Parts of the 5G communication network 118 described above with reference to FIG. 1 may be implemented substantially like the communication system 550 described in FIG. 5 and FIG. 6. Typically, the communication system 550 includes a number of access nodes 554A-554C that are configured to provide coverage in which UEs 552 such as cell phones, tablet computers, machine-type-communication devices, tracking devices, embedded wireless modules, and/or other wirelessly equipped communication devices (whether or not user operated), can operate. The UE 552 may be the UE 102 that operates with the 5G communication network 118 (FIG. 1). The access nodes 554A-554C may be said to establish an access network 556. The access network 556 may be referred to as a radio access network (RAN) in some contexts. In a 5G technology generation, an access node 554A-554C may be referred to as a gigabit Node B (gNB). In 4G technology (e.g., long term evolution (LTE) technology) an access node 554A-554C may be referred to as an enhanced Node B (eNB). In 3G technology (e.g., code division multiple access (CDMA) and global system for mobile communication (GSM)) an access node 554A-554C may be referred to as a base transceiver station (BTS) combined with a basic station controller (BSC). In some contexts, the access node 554A-554C may be referred to as a cell site or a cell tower. In some implementations, a picocell may provide some of the functionality of an access node 554A-554C, albeit with a constrained coverage area. Each of these different embodiments of an access node 554A-554C may be considered to provide roughly similar functions in the different technology generations.

In an embodiment, the access network 556 comprises a first access node 554A, a second access node 554B, and a third access node 554C. It is understood that the access network 556 may include any number of access nodes 554A-554C. Further, each access node 554A-554C could be coupled with a 5G core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554A-554C and could thereby communicate via the access node 554A-554C with various application servers and other entities. In another embodiment, the sub-systems may communicate via the access nodes 554A-554C.

The communication system 550 could operate in accordance with a particular RAT, with communications from an access node 554A-554C to UEs 552 defining a downlink or forward link and communications from the UEs 552 to the access node 554A-554C defining an uplink or reverse link. Over the years, the industry has developed various generations of RATs, in a continuous effort to increase available data rate and quality of service for end users. These generations have ranged from "1 G," which used simple analog frequency modulation to facilitate basic voice-call service, to "4G"—such as LTE, which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554A-554C could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in an RF spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554A-554C and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554A-554C to served UEs 552. And on the uplink, certain resource elements could be reserved to carry random access signaling from UEs 552 to the access node 554A-554C, and other resource elements could be reserved to carry other control signaling such as PRB-scheduling requests and acknowledgement signaling from UEs 552 to the access node 554A-554C.

The access node 554A-554C, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center. The CU may be hosted in user equipment.

Figure 6:
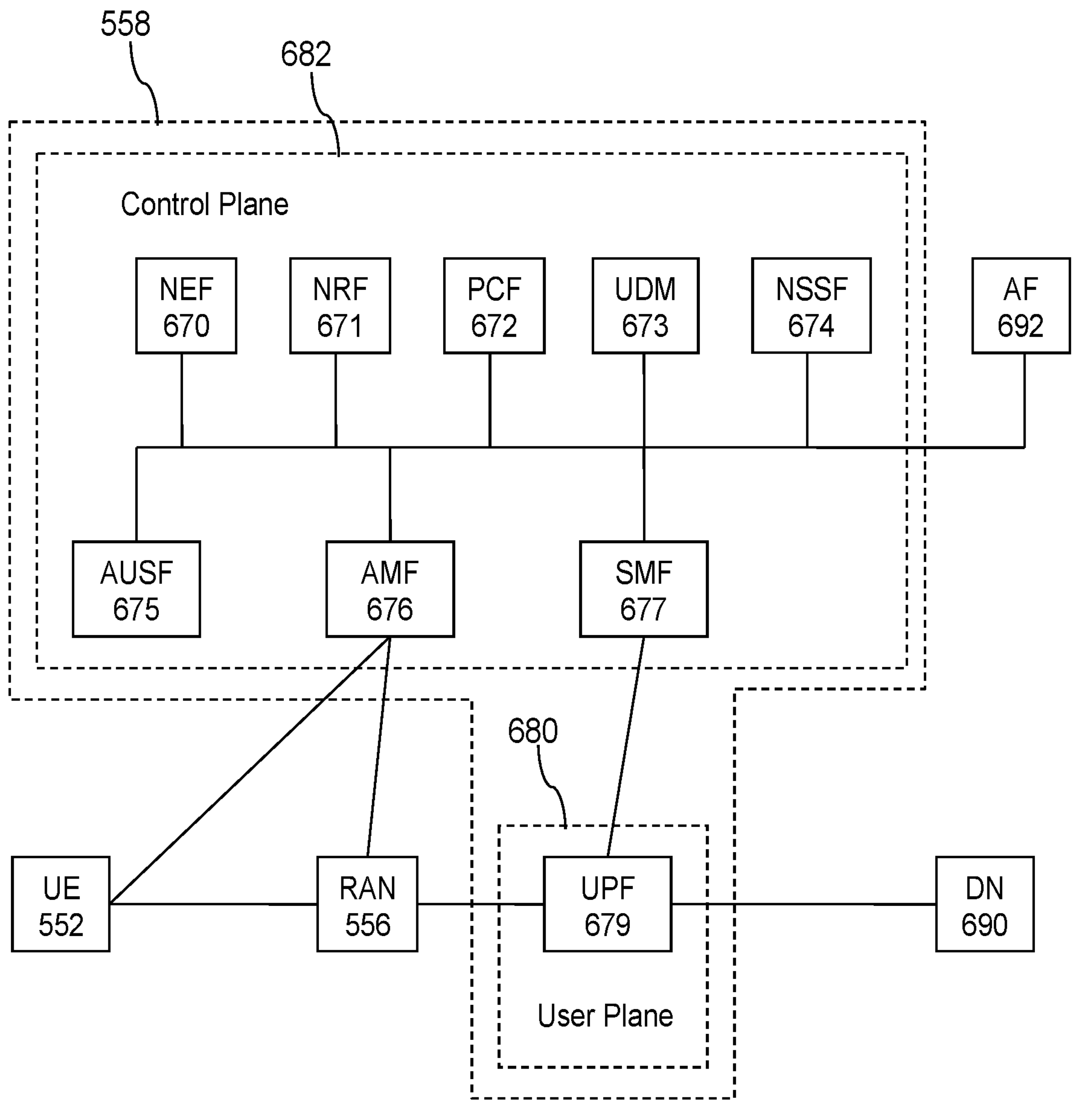
FIG. 6 is a block diagram of a core network of a communication system according to an embodiment of the disclosure.

Turning now to FIG. 6, further details of the core network 558 are described. In an embodiment, the core network 558 is a 5G core network. In an embodiment, the core network 558 may be constructed on the UE 102 (FIG. 1). 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed in a private domain environment which supports dynamic scaling and avoidance of long-term capital expenditures (fees for use may substitute for capital expenditures). In an embodiment, these services or network functions may be executed on user equipment such as, for example, executed on the UE 102 of FIG. 1. These network functions can include, for example, a user plane function (UPF) 679, an authentication server function (AUSF) 675, an access and mobility management function (AMF) 676, a session management function (SMF) 677, a network exposure function (NEF) 670, a network repository function (NRF) 671, a policy control function (PCF) 672, a unified data management (UDM) 673, a network slice selection function (NSSF) 674, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 680 and a control plane 682, thereby promoting independent scalability, evolution, and flexible deployment.

The UPF 679 delivers packet processing and links the UE 552, via the access node 554, to a data network 690 (e.g., the network 560 illustrated in FIG. 5 or the communication network 118 in FIG. 1). As discussed above, the UE 552 may be the UE 102 that operates with the 5G communication network 118 (FIG. 1). The AMF 676 handles registration and connection management of non-access stratum (NAS) signaling with the UE 552. Said in other words, the AMF 676 manages UE registration and mobility issues. The AMF 676 manages reachability of the UEs 552 as well as various security issues. The SMF 677 handles session management issues. Specifically, the SMF 677 creates, updates, and removes (destroys) protocol data unit (PDU) sessions and manages the session context within the UPF 679. The SMF 677 decouples other control plane functions from user plane functions by performing dynamic host configuration protocol (DHCP) functions and IP address management functions. The AUSF 675 facilitates security processes.

The NEF 670 securely exposes the services and capabilities provided by network functions. The NRF 671 supports service registration by network functions and discovery of network functions by other network functions. The PCF 672 supports policy control decisions and flow-based charging control. The UDM 673 manages network user data and can be paired with a user data repository (UDR) that stores user data such as customer profile information, customer authentication number, and encryption keys for the information. An application function 692, which may be located outside of the core network 558, exposes the application layer for interacting with the core network 558. In an embodiment, the application function 692 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 674 can help the AMF 676 to select the network slice instance (NSI) for use with the UE 552.

Figure 7:
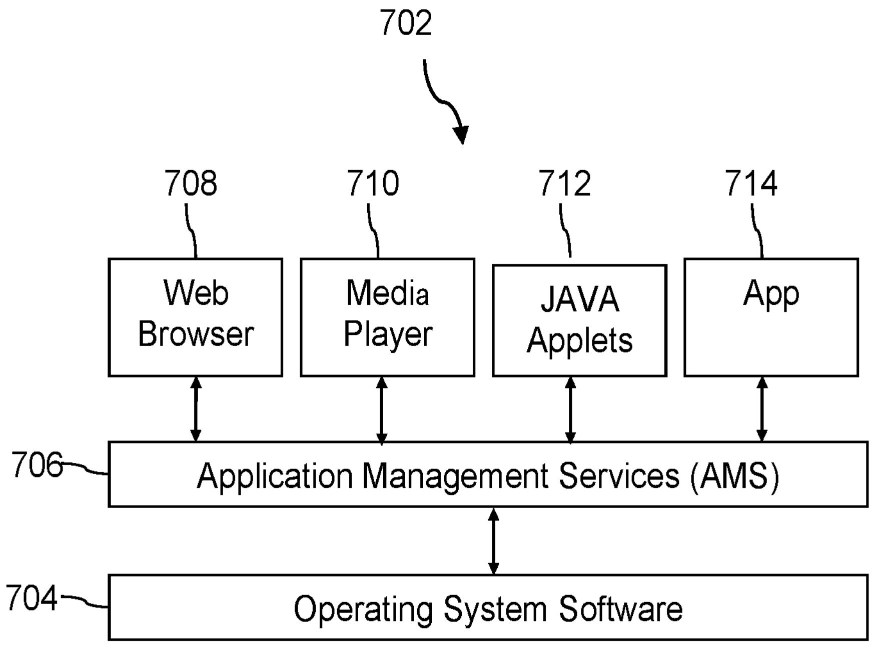
FIG. 7 is a block diagram of software architecture of a communication device according to an embodiment of the disclosure.

FIG. 7 illustrates a software environment 702 that may be implemented by the DSP 402. The DSP 402 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the UE 400. Also shown in FIG. 7 are a web browser application 708, a media player application 710, and JAVA applets 712. The web browser application 708 may be executed by the UE 400 to browse content and/or the Internet, for example when the UE 400 is coupled to a network via a wireless link. The web browser application 708 may permit a user to enter information into forms and select links to retrieve and view web pages. The media player application 710 may be executed by the UE 400 to play audio or audiovisual media. The JAVA applets 712 may be executed by the UE 400 to provide a variety of functionality including games, utilities, and other functionality.

Figure 8:
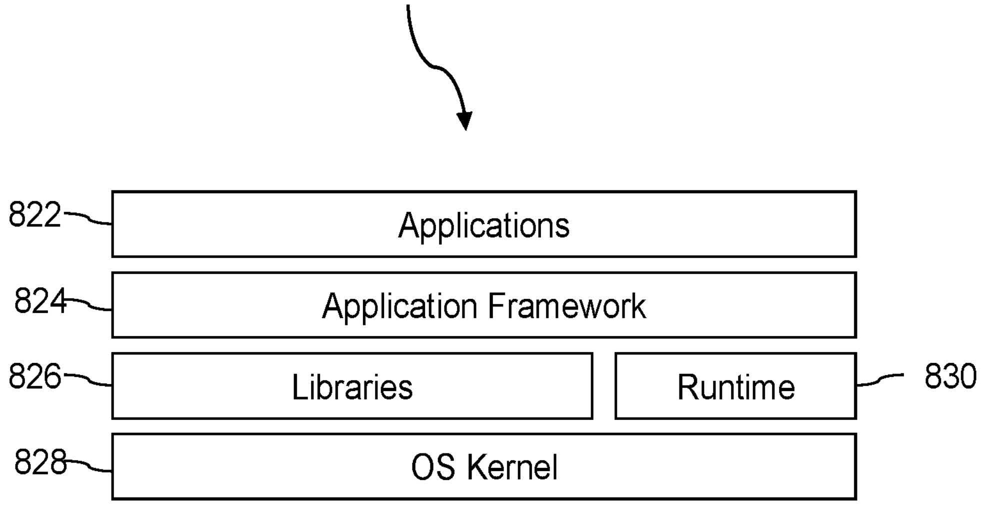
FIG. 8 is a block diagram of another software architecture of a communication device according to an embodiment of the disclosure.

FIG. 8 illustrates an alternative software environment 820 that may be implemented by the DSP 402. The DSP 402 executes operating system kernel (OS kernel) 828 and an execution runtime 830. The DSP 402 executes applications 822 that may execute in the execution runtime 830 and may rely upon services provided by the application framework 824. Applications 822 and the application framework 824 may rely upon functionality provided via the libraries 826.

Figure 9:
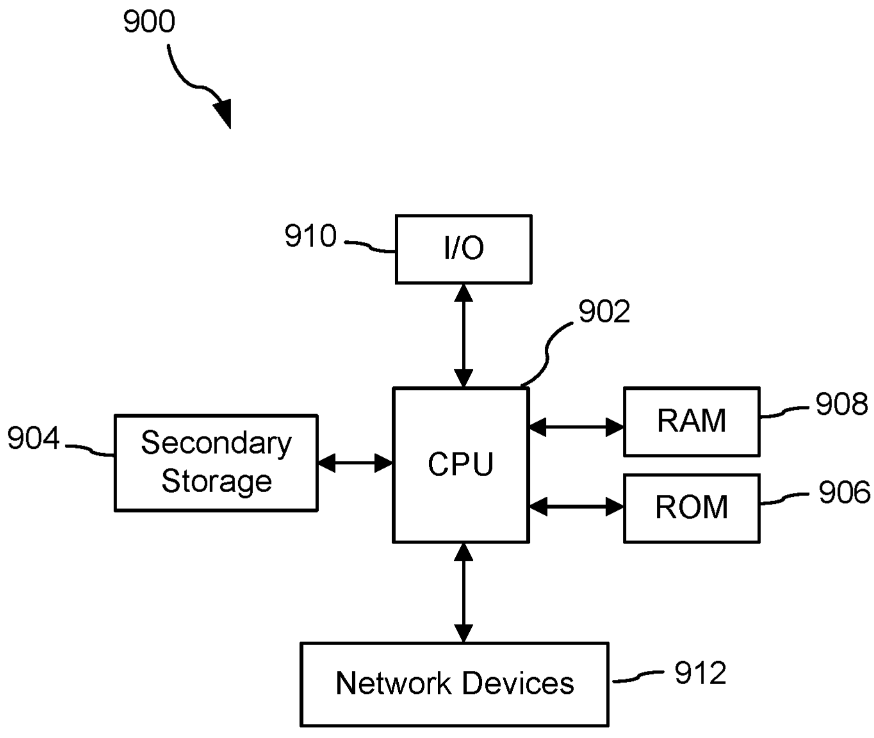
FIG. 9 is a block diagram of a computer system according to an embodiment of the disclosure.

FIG. 9 illustrates a computer system 900 suitable for implementing one or more embodiments disclosed herein. The computer system 900 includes a processor 902 (which may be referred to as a central processor unit (CPU)) that is in communication with memory devices including secondary storage 904, read-only memory (ROM) 906, random-access memory (RAM) 908, input/output (I/O) devices 910, and network connectivity devices 912. The computer system 900 may be UE 102, federated identity manager server 122, or metaverse server 128. The processor 902 may be implemented as one or more CPU chips.

It is understood that by programming and/or loading executable instructions onto the computer system 900, at least one of the CPU 902, the RAM 908, and the ROM 906 are changed, transforming the computer system 900 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application-specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 900 is turned on or booted, the CPU 902 may execute a computer program or application. For example, the CPU 902 may execute software or firmware stored in the ROM 906 or stored in the RAM 908. In some cases, on boot and/or when the application is initiated, the CPU 902 may copy the application or portions of the application from the secondary storage 904 to the RAM 908 or to memory space within the CPU 902 itself, and the CPU 902 may then execute instructions that the application is comprised of. In some cases, the CPU 902 may copy the application or portions of the application from memory accessed via the network connectivity devices 912 or via the I/O devices 910 to the RAM 908 or to memory space within the CPU 902, and the CPU 902 may then execute instructions that the application is comprised of. During execution, an application may load instructions into the CPU 902, for example load some of the instructions of the application into a cache of the CPU 902. In some contexts, an application that is executed may be said to configure the CPU 902 to do something, e.g., to configure the CPU 902 to perform the function or functions promoted by the subject application. When the CPU 902 is configured in this way by the application, the CPU 902 becomes a specific purpose computer or a specific purpose machine.

The secondary storage 904 is typically comprised of one or more disk drives or tape drives and is used for non-volatile storage of data and as an over-flow data storage device if RAM 908 is not large enough to hold all working data. Secondary storage 904 may be used to store programs which are loaded into RAM 908 when such programs are selected for execution. The ROM 906 is used to store instructions and perhaps data which are read during program execution. ROM 906 is a non-volatile memory device which typically has a small memory capacity relative to the larger memory capacity of secondary storage 904. The RAM 908 is used to store volatile data and perhaps to store instructions. Access to both ROM 906 and RAM 908 is typically faster than to secondary storage 904. The secondary storage 904, the RAM 908, and/or the ROM 906 may be referred to in some contexts as computer readable storage media and/or non-transitory computer readable media.

I/O devices 910 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 912 may take the form of modems, modern banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 912 may provide wired communication links and/or wireless communication links (e.g., a first network connectivity device 912 may provide a wired communication link and a second network connectivity device 912 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, ZIGBEE, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 912 may enable the processor 902 to communicate with the Internet or one or more intranets. With such a network connection, it is contemplated that the processor 902 might receive information from the network, or might output information to the network in the course of performing the above-described method steps. Such information, which is often represented as a sequence of instructions to be executed using processor 902, may be received from and outputted to the network, for example, in the form of a computer data signal embodied in a carrier wave.

Such information, which may include data or instructions to be executed using processor 902 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 902 executes instructions, codes, computer programs, scripts which it accesses from hard disk, floppy disk, optical disk (these various disk based systems may all be considered secondary storage 904), flash drive, ROM 906, RAM 908, or the network connectivity devices 912. While only one processor 902 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 904, for example, hard drives, floppy disks, optical disks, and/or other device, the ROM 906, and/or the RAM 908 may be referred to in some contexts as non-transitory instructions and/or non-transitory information.

In an embodiment, the computer system 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 900 to provide the functionality of a number of servers that is not directly bound to the number of computers in the computer system 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer-usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 900, at least portions of the contents of the computer program product to the secondary storage 904, to the ROM 906, to the RAM 908, and/or to other non-volatile memory and volatile memory of the computer system 900. The processor 902 may process the executable instructions and/or data structures in part by directly accessing the computer program product, for example by reading from a CD-ROM disk inserted into a disk drive peripheral of the computer system 900. Alternatively, the processor 902 may process the executable instructions and/or data structures by remotely accessing the computer program product, for example by downloading the executable instructions and/or data structures from a remote server through the network connectivity devices 912. The computer program product may comprise instructions that promote the loading and/or copying of data, data structures, files, and/or executable instructions to the secondary storage 904, to the ROM 906, to the RAM 908, and/or to other non-volatile memory and volatile memory of the computer system 900.

In some contexts, the secondary storage 904, the ROM 906, and the RAM 908 may be referred to as a non-transitory computer readable medium or a computer readable storage media. A dynamic RAM embodiment of the RAM 908, likewise, may be referred to as a non-transitory computer readable medium in that while the dynamic RAM receives electrical power and is operated in accordance with its design, for example during a period of time during which the computer system 900 is turned on and operational, the dynamic RAM stores information that is written to it. Similarly, the processor 902 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for authenticating an identity in a metaverse for purchasing digital content according to a trusted identity in a physical world, and comprising:

a metaverse server configured to:

receive, from a user communication device, a request to purchase a digital content by a virtual identity in a metaverse application, wherein the virtual identity is associated with a user of the user communication device, and wherein the metaverse server comprises the metaverse application, and send, to a federated identity manager server, the request to purchase the digital content and the virtual identity;

the federated identity manager server configured to:

receive, from the metaverse server, the virtual identity and user credentials of the user associated with the virtual identity, receive, from a mobile network operator (MNO), subscriber information of the user, create a trusted identity of the user based on the virtual identity and the subscriber information, receive, from the metaverse server, a request to purchase the digital content, send, to the metaverse server, a verification request responsive to receiving the request to purchase the digital content, wherein the verification request includes an instruction to perform a predetermined action using the virtual identity in the metaverse application, wherein the predetermined action is configured to confirm the identity of the user, wherein the predetermined action involves the virtual identity interacting with the metaverse in a particular manner in response to a to-be-identified user providing inputs to a user equipment through an application executed by the user equipment, and wherein the instruction does not identify the particular manner of interaction, receive, from the metaverse server, an indication that the user performed the predetermined action by providing the inputs to the user equipment through the application executed by the user equipment based on comparing the particular manner of interaction to performed actions of the virtual identity, send, to the metaverse server, a verification result responsive to receiving the indication that the user performed the predetermined action, wherein the verification result indicates the user is verified to purchase the digital content, and send, to the MNO, billing confirmation for the digital content, wherein the billing confirmation indicates the digital content is allocated to the user; and the MNO configured to charge the user for the digital content based on carrier billing responsive to receiving the billing confirmation.

2. The system of claim 1, wherein the federated identity manager server is further configured to:

receive, from the metaverse server, login information of the user in the metaverse application, and associate the login information with the virtual identity of the user in the metaverse application.

3. The system of claim 1, wherein the federated identity manager server is further configured to map the virtual identity to subscriber information of the user at the MNO.

4. The system of claim 1, wherein the verification request further comprises a push notification to the virtual identity in the metaverse application when the virtual identity is active in the metaverse application.

5. The system of claim 1, wherein the verification request further comprises a push notification to a Mobile Station Integrated Services Digital Network (MSISDN) number associated with the metaverse identity when the virtual identity is inactive in the metaverse application.

6. The system of claim 5, wherein the verification request further instructs the user associated with the MSISDN to login into the metaverse using the metaverse application and perform the predetermined action for the virtual identity in the metaverse application.

7. The system of claim 1, wherein the billing confirmation comprises subscriber information of the user at the MNO.

8. A system for authenticating an identity in a metaverse for purchasing digital content according to a trusted identity in a physical world, and comprising:

a federated identity manager server configured to:

receive, from a metaverse server, a virtual identity in a metaverse application and user credentials of a user associated with the virtual identity in the metaverse application, receive, from a mobile network operator (MNO), subscriber information of the user, create a trusted identity of the user based on the virtual identity and the subscriber information, receive, from the metaverse server, a request to purchase the digital content by the virtual identity in a metaverse application of the metaverse server, send, to the metaverse server, a verification request responsive to receiving the request to purchase the digital content, wherein the verification request includes an instruction to perform a predetermined action using the virtual identity in the metaverse application, wherein the predetermined action is configured to confirm the identity of the user, wherein the predetermined action involves the virtual identity interacting with the metaverse in a particular manner in response to a to-be-identified user providing inputs to a user equipment through an application executed by the user equipment, and wherein the instruction does not identify the particular manner of interaction, receive, from the metaverse server, an indication that the user performed the predetermined action by providing the inputs to the user equipment through the application executed by the user equipment based on comparing the particular manner of interaction to performed actions of the virtual identity, send, to the metaverse server, a verification result responsive to receiving the indication that the user performed the predetermined action, wherein the verification result indicates the user is verified to purchase the digital content, send, to the MNO, billing confirmation for the digital content, wherein the billing confirmation indicates the digital content is allocated to the user, and the MNO coupled to the federated identity manager server and configured to charge the user for the digital content based on carrier billing responsive to receiving the billing confirmation.

9. The system of claim 8, further comprising:

receiving, by the federated identity manager server from the metaverse server, login information of the user in the metaverse application; and associating, by the federated identity manager, the login information with the virtual identity of the user in the metaverse application.

10. The system of claim 8, further comprising mapping, by the federated identity manager server, the virtual identity to subscriber information of the user at the MNO.

11. The system of claim 8, wherein the verification request further comprises a push notification to the virtual identity in the metaverse application when the virtual identity is active in the metaverse application.

12. The system of claim 11, further comprising, instructing, by the federated identity manager server, the virtual identity to perform a validation challenge in the metaverse application, wherein the validation challenge comprises the predetermined action for the virtual identity.

13. The system of claim 8, wherein the verification request further comprises a push notification to a Mobile Station Integrated Services Digital Network (MSISDN) number associated with the metaverse identity when the virtual identity is inactive in the metaverse application.

14. The system of claim 13, further comprising instructing, by the federated identity manager server, the user of the virtual identity and associated with the MSISDN to connect into the metaverse server using the metaverse application and perform the predetermined action in the metaverse application.

15. The system of claim 8, wherein the billing confirmation comprises subscriber information of the user at the MNO.

16. A federated identity manager server for authenticating an identity in a metaverse for purchasing digital content according to a trusted identity in a physical world, and comprising:

a central processing unit (CPU); and a non-transitory memory comprising executable instructions that when executed by the CPU, cause the federated identity manager server to:

receive, from a metaverse application via a metaverse server, a virtual identity of a user and user credentials of the user associated with the virtual identity, wherein the metaverse server comprises the metaverse application, receive, from a mobile network operator (MNO), subscriber information of the user, create a trusted identity of the user based on the virtual identity and the subscriber information, receive, from the metaverse server, a request to purchase digital content by the virtual identity in the metaverse application, send, to the metaverse server, a verification request responsive to receiving the request to purchase the digital content, wherein the verification request includes a validation challenge comprising an instruction to perform a predetermined action using the virtual identity in the metaverse application, wherein the predetermined action is configured to confirm the identity of the user, wherein the predetermined action involves the virtual identity interacting with the metaverse in a particular manner in response to a to-be-identified user providing inputs to a user equipment through an application executed by the user equipment, and wherein the instruction does not identify the particular manner of interaction, receive, from the metaverse server, an indication that the user performed the predetermined action by providing the inputs to the user equipment through the application executed by the user equipment based on comparing the particular manner of interaction to performed actions of the virtual identity, send, to a communication device via the metaverse server, a verification result responsive to receiving the indication that the user performed the predetermined action, wherein the verification result indicates the user of the communication device is verified to purchase the digital content, send, to the MNO, billing confirmation for the digital content, wherein the billing confirmation indicates the digital content is allocated to the user, and receive, from the MNO, a confirmation message that indicates the user is carrier billed for the digital content.

17. The federated identity manager server of claim 16, wherein the federated identity manager server is further configured to:

receive, from the metaverse server, login information of the user in the metaverse application, and associate the login information with the virtual identity of the user in the metaverse application.

18. The federated identity manager server of claim 16, wherein the federated identity manager server is further configured to map the virtual identity to subscriber information of the user at the MNO.

19. The federated identity manager server of claim 16, wherein the verification request further comprises a push notification to the metaverse identity when the virtual identity is active in the metaverse application.

* * * * *